United States Patent
Olofsson et al.

(10) Patent No.: US 12,409,694 B2
(45) Date of Patent: Sep. 9, 2025

(54) HYDRAULIC FLUID RESERVOIR INCLUDING A FLEXIBLE HOUSING

(71) Applicant: DRIV AUTOMOTIVE INC., Skokie, IL (US)

(72) Inventors: Carl Olofsson, Zepperen (BE); Stein Slootmaekers, Wellen (BE); Joris VanWezemael, Leuven (BE)

(73) Assignee: DRIV Automotive Inc., Skokie, IL (US)

( * ) Notice: Subject to any disclaimer, the term of this patent is extended or adjusted under 35 U.S.C. 154(b) by 412 days.

(21) Appl. No.: 17/893,805

(22) Filed: Aug. 23, 2022

(65) Prior Publication Data

US 2024/0066938 A1 Feb. 29, 2024

(51) Int. Cl.
*B60G 13/14* (2006.01)
*B60G 13/08* (2006.01)

(52) U.S. Cl.
CPC ............. *B60G 13/14* (2013.01); *B60G 13/08* (2013.01); *B60G 2202/24* (2013.01); *B60G 2202/416* (2013.01); *B60G 2206/41* (2013.01)

(58) Field of Classification Search
CPC .... B60G 13/08; B60G 13/14; B60G 2202/24; B60G 2202/416; B60G 2206/41
USPC ............... 188/314, 318; 280/5.512, 124.157, 280/124.159, 124.16; 267/64.15, 64.19, 267/64.23
See application file for complete search history.

(56) References Cited

U.S. PATENT DOCUMENTS

| | | | |
|---|---|---|---|
| 2,982,538 A | 5/1961 | Bourcier | |
| 3,041,062 A | 6/1962 | Bliven | |
| 4,275,900 A | 6/1981 | Andreoli et al. | |
| 4,813,519 A * | 3/1989 | Matsubara | F16F 9/096 267/64.15 |
| 4,828,231 A * | 5/1989 | Fukumura | F16F 9/088 267/64.19 |
| 5,020,826 A | 6/1991 | Stecklein et al. | |
| 5,042,781 A * | 8/1991 | Ezure | F16F 9/096 267/64.23 |
| 6,270,098 B1 | 8/2001 | Heyring et al. | |
| 2012/0169088 A1 | 7/2012 | Scheff | |

FOREIGN PATENT DOCUMENTS

| | | |
|---|---|---|
| DE | 102007034315 A1 | 7/2009 |
| FR | 2990158 A1 | 11/2013 |
| GB | 828349 A | 2/1960 |
| GB | 1194764 A | 6/1970 |
| WO | 1998047730 A1 | 10/1998 |

OTHER PUBLICATIONS

Extended European Search Report for Counterpart EP23191987.9, Dated Feb. 15, 2024, 7 Pages.

* cited by examiner

*Primary Examiner* — Christopher P Schwartz
(74) *Attorney, Agent, or Firm* — McGarry Bair PC

(57) ABSTRACT

A hydraulic fluid reservoir fluidly couple to a shock absorber. The hydraulic fluid reservoir having a flexible housing, a fluid channel, and a pump provided along the fluid channel. The flexible housing having a flexible wall defining a first interior, with the first interior a variable volume of hydraulic fluid and no air. The fluid channel fluidly coupling the first interior with the shock absorber. The pump being configured to move the flow of hydraulic fluid into or out of the flexible housing. The flexible housing being configured to move between a first position and a second position.

20 Claims, 3 Drawing Sheets

HYDRAULIC FLUID RESERVOIR INCLUDING A FLEXIBLE HOUSING

TECHNICAL FIELD

The disclosure generally relates to an oil reservoir, and more specifically to an oil reservoir of a vehicle.

BACKGROUND

Shock absorbers are used in conjunction with automotive suspension systems to absorb unwanted vibrations which occur during driving. To absorb the unwanted vibrations, shock absorbers are generally connected between the sprung portion (body) and the unsprung portion (suspension) of the automobile. A piston is located within a pressure tube of the shock absorber and the pressure tube is normally attached to the unsprung portion of the vehicle. The piston is normally attached to a piston rod which extends through the pressure tube to be connected to the sprung portion of the vehicle. It will be appreciated, however, that in some instances the piston rod can be connected to the unsprung portion of the vehicle, while the pressure tube can be connected to the sprung portion of the vehicle. The piston divides the pressure tube into an upper working chamber and a lower working chamber both of which are typically filled with a hydraulic liquid. Because the piston is able, through valving, to limit the flow of the hydraulic liquid between the upper and the lower working chambers when the shock absorber is compressed or extended, the shock absorber is able to produce a damping force which counteracts the vibration which would otherwise be transmitted from the unsprung portion of the vehicle to the sprung portion of the vehicle. In a dual tube shock absorber, a fluid reservoir or reserve chamber is defined between the pressure tube and a reserve tube. A base valve is located between the lower working chamber and the reserve chamber to also produce a damping force which counteracts the vibrations which would otherwise be transmitted from the unsprung portion to the sprung portion of the vehicle.

An excess of the hydraulic liquid within the shock absorber is stored within a hydraulic fluid reservoir. The hydraulic fluid reservoir comprises a rigid housing defining an interior. Based on the operation of the shock absorber, a volume of hydraulic fluid within the interior can change. A remaining portion of the interior is filled with a gas (e.g., air). A bleed valve can be provided along the hydraulic fluid reservoir to bleed excess air from the interior of the rigid housing. Varying the pressure of the hydraulic fluid within the shock absorbers can result in a shock absorbed with varying damping capabilities. This, in turn, translates to a variable ride (e.g., a rigid or stiff ride versus of floating ride) when the shock absorber is provided on a vehicle. To provide for a rigid or stiff ride, hydraulic fluid from the hydraulic fluid reservoir can be provided to the shock absorber. To provide for a floating ride, fluid from the shock absorbers can be provided from the shock absorber to the hydraulic fluid reservoir. Thus, the ratio of hydraulic fluid and gas can vary within the hydraulic fluid reservoir, with it being understood that there is always a gas (e.g., air) within the interior.

BRIEF DESCRIPTION

In one aspect, the disclosure relates to a hydraulic fluid reservoir fluidly coupled to a shock absorber, the hydraulic fluid reservoir comprising a flexible housing having a flexible wall defining a first interior, with the first interior a variable volume of hydraulic fluid and no air, a fluid channel fluidly coupling the first interior of the flexible housing to the shock absorber, the fluid channel configured to permit a flow of hydraulic fluid to enter and exit the first interior of the flexible housing to define the variable volume of hydraulic fluid, and a pump provided along the fluid channel, the pump being configured to move the flow of hydraulic fluid into or out of the flexible housing, wherein during operation, the flow of hydraulic fluid expands and contracts the flexible housing between a first position defining a maximum volume of the first interior and a second position defining a minimum volume of the first interior, respectively.

In another aspect, the disclosure relates to a hydraulic fluid reservoir fluidly coupled to a shock absorber, the hydraulic fluid reservoir comprising a flexible housing having flexible wall defining a first interior, with the first interior a variable volume of hydraulic fluid and no air, an outer housing having an outer wall defining a second interior, a fluid channel fluidly coupled to the first interior and configured to permit a flow of hydraulic fluid to enter and exit the first interior of the flexible housing to define the variable volume of hydraulic fluid, and a pump provided along the fluid channel, the pump being configured to move the flow of hydraulic fluid into or out of the flexible housing wherein the flexible housing is provided within the second interior.

In yet another aspect, the disclosure relates to a hydraulic fluid reservoir comprising a flexible housing having a flexible housing wall defining an interior, a fluid channel fluidly coupled to the interior and configured to permit a flow of hydraulic fluid to enter and exit the interior of the flexible housing, and a pump provided along the fluid channel, the pump being configured to move the flow of hydraulic fluid into or out of the flexible housing wherein during operation, the flow of hydraulic fluid can enter or exit the interior of the flexible housing to expand and contract the flexible housing between a first position defining a maximum volume of the interior and a second position defining a minimum volume of the interior, respectively.

BRIEF DESCRIPTION OF THE DRAWINGS

A full and enabling disclosure of the present description, including the best mode thereof, directed to one of ordinary skill in the art, is set forth in the specification, which refers to the appended FIGS., in which.

DETAILED DESCRIPTION

Figure 1:
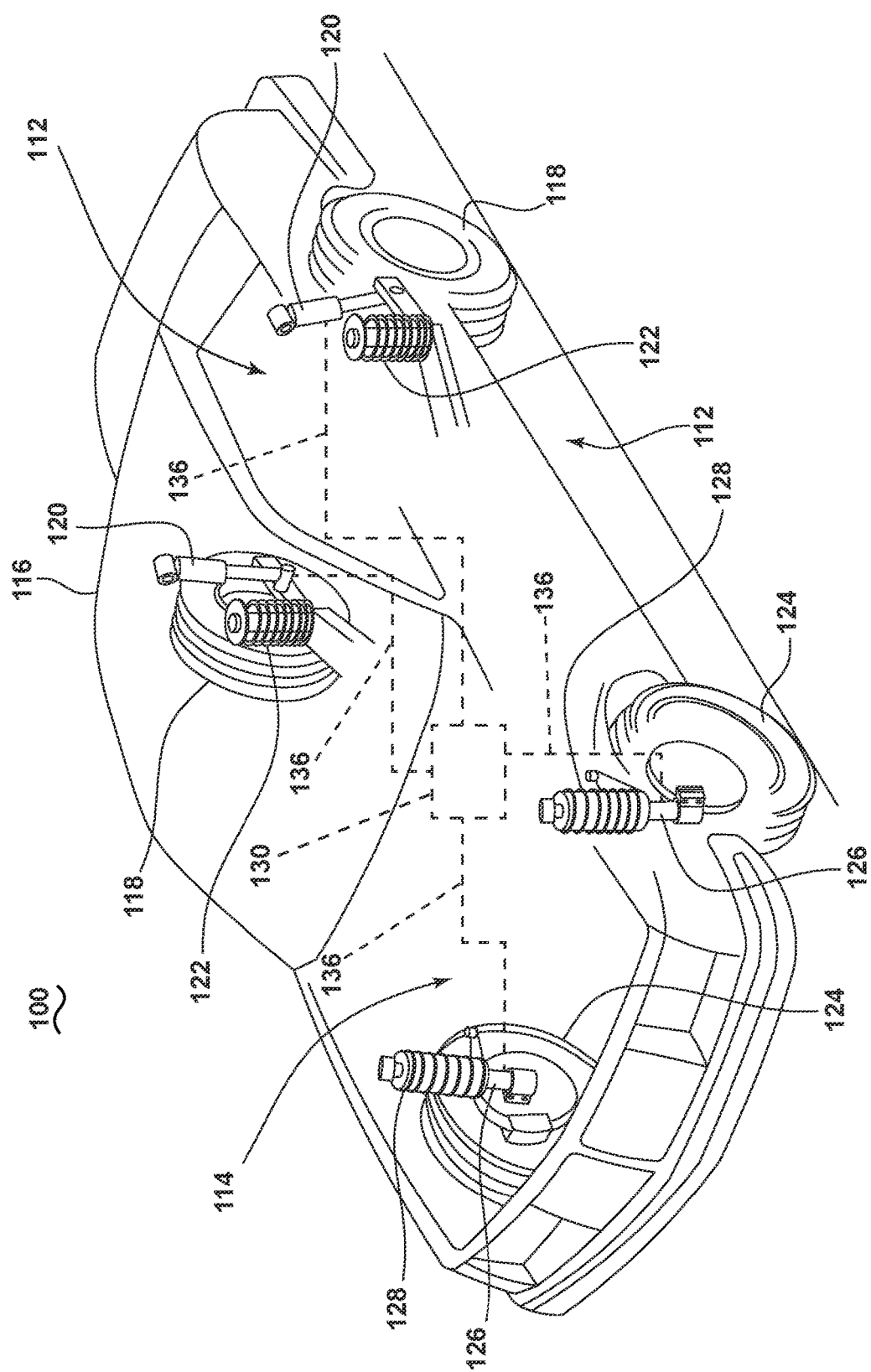
FIG. 1 is a schematic perspective view of a vehicle having at least one shock absorber and at least one hydraulic fluid reservoir fluidly coupled to the at least one shock absorber.

Aspects of this disclosure described herein are broadly directed to a hydraulic fluid reservoir having a flexible housing defining an interior. A volume of hydraulic fluid can be received within the interior. As used herein, the term "hydraulic fluid" can refer to any suitable fluid configured to transfer a force through the fluid. As a non-limiting example, the hydraulic fluid can be used to transfer or otherwise produce a damping force. The interior does not include air.

The hydraulic fluid reservoir can be fluidly coupled to any suitable component and be configured to supply and receive a flow of hydraulic fluid to the component. As a non-limiting example, the hydraulic fluid reservoir can be fluidly coupled to a shock absorber. The hydraulic fluid reservoir can be utilized within any suitable environment. As a non-limiting example, the hydraulic fluid reservoir can be utilized within a vehicle (e.g., an automobile with an engine). It will be understood, however, that aspects of the disclosure described herein are not so limited and can have general applicability within other assemblies including a hydraulic reservoir. For example, the disclosure can have applicability for hydraulic fluid reservoirs in other applications or vehicles, and can be used to provide benefits in industrial, commercial, and residential applications.

As used herein, the term "upstream" refers to a direction that is opposite the fluid flow direction, and the term "downstream" refers to a direction that is in the same direction as the fluid flow. Furthermore, as used herein, the term "set" or a "set of elements" can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, secured, fastened, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is a schematic perspective view of a vehicle 100 having at least one shock absorber and at least one hydraulic fluid reservoir 130 fluidly coupled to the at least one shock absorber. The at least one hydraulic fluid reservoir 130 can be configured to supply or receive a supply of hydraulic fluid from the at least one shock absorber.

The vehicle 100 can include a body 116, a rear suspension system 112 and a front suspension system 114. The rear suspension system 112 can include a pair of independent suspensions that operatively support a pair of rear wheels 118. Each rear independent suspension is attached to body 116 through at least one rear shock absorber 120 and a rear helical coil spring 122. The front suspension system 114 includes a pair of independent suspensions that operatively support a pair of front wheels 124. Each independent front suspension is attached to body 116 through at least one front shock absorber 126 and a front helical coil spring 128. As a non-limiting example, the front helical coil spring 128 can be integrally formed or otherwise formed along the front shock absorber 126, while the rear helical coil spring 122 can be separate from the rear shock absorber 120. The at least one rear shock absorber 120 and the at least one front shock absorber 126 serve to dampen the relative movement of the unsprung portion of vehicle 100 (i.e., front and rear suspension systems 112 and 114 respectively) with respect to the sprung portion (i.e., body 116) of vehicle 100. The vehicle 100 can include a total of four wheels, with a shock absorber operatively coupled to each wheel. As a non-limiting example, the front suspension system 114 can include two front wheels 124 and two corresponding front shock absorbers 126. As a non-limiting example, the rear suspension system 112 can include to rear wheels 118 and two corresponding rear shock absorbers 120. It will be appreciated that the vehicle 100 can include any number of one or more wheels with a corresponding shock absorber. Alternatively, a single shock absorber can be used on multiple wheels. While the vehicle 100 is depicted as a passenger vehicle having independent front suspension system 114, rear suspension system 112, front shock absorber 126 and rear shock absorb 120, the aspects described herein can be applied to other types of vehicles having other types of suspensions and springs or in other applications including, but not limited to, vehicles incorporating air springs instead of coil springs, leaf springs instead of coil springs, non-independent front and/or non-independent rear suspension systems.

The vehicle 100 can further include the at least one hydraulic fluid reservoir 130 fluidly coupled to at least a portion of the front shock absorbers 126 and the rear shock absorbers 120. The at least one hydraulic fluid reservoir 130 can be fluidly coupled to the front shock absorbers 126 and the rear shock absorbers 120 through at least one fluid channel 136. While illustrated as a single hydraulic fluid reservoir 130, it will be appreciated that there can be any number of hydraulic fluid reservoirs 130. As a non-limiting example, there can be two separate hydraulic fluid reservoirs 130; one for the front suspension system 114 (e.g., fluidly coupled to the front shock absorbers 126) and one for the rear suspension system 112 (e.g., fluidly coupled to the rear shock absorbers 120). As a non-limiting example, there can be two hydraulic fluid reservoirs 130 daisy chained or connected in parallel with one another such that they can collectively supply or receive a supply of hydraulic fluid from the front shock absorbers 126 and the rear shock absorbers 120.

It will be appreciated that additional other components can included within the vehicle 100. As a non-limiting example, an electronic control unit can be provided that is communicatively and operably coupled to the at least the front shock absorbers 126, the rear shock absorbers 120 and the at least one hydraulic fluid reservoir 130. The electronic control unit can be used to determine a need for hydraulic fluid in one of the front shock absorbers 126, the rear shock absorbers 120 and the at least one hydraulic fluid reservoir 130 and operate a portion of the vehicle 100 (e.g., a valve provided on the fluid channel 136) to provide hydraulic fluid to at least one of the front shock absorbers 126, the rear shock absorbers 120 or the at least one hydraulic fluid reservoir 130.

During operation of the vehicle 100, the front shock absorbers 126 and the rear shock absorbers 120 can dampen the movement of the front wheels 124 and the rear wheels 118, respectively, to limit the movement of the body 116 during normal use of the vehicle 100. A pressure of the hydraulic fluid within the front shock absorbers 126 and the rear shock absorbers 120 can be varied by supplying hydraulic fluid to or from the at least one hydraulic fluid reservoir 130. The variation of the pressure of the hydraulic fluid can, in turn, affect the ride of the vehicle 100. As used herein, the "ride" refers to the movement of the body 116 during operation of the vehicle 100. In some instances, it is preferable to have a soft ride where the body 116 can move and sway a larger distance. This, in turn, can dampen or otherwise lessen the impact of the movement of the wheels 124, 118 on the body 116. A soft ride can be achieved by lowering the pressure of hydraulic fluid within the front shock absorbers 126 and the rear shock absorbers 120 by providing the removed hydraulic fluid to the at least one hydraulic fluid reservoir 130. In other instances, it may be preferable to have a stiff ride such that sway of the body 116 is limited. A stiff ride can be achieved by maximizing the pressure of hydraulic fluid within the front shock absorbers 126 and the rear shock absorbers 120 by supplying at least some of the hydraulic fluid within the at least one hydraulic fluid reservoir 130 to the front shock absorbers 126 and the rear shock absorbers 120.

Figure 2:
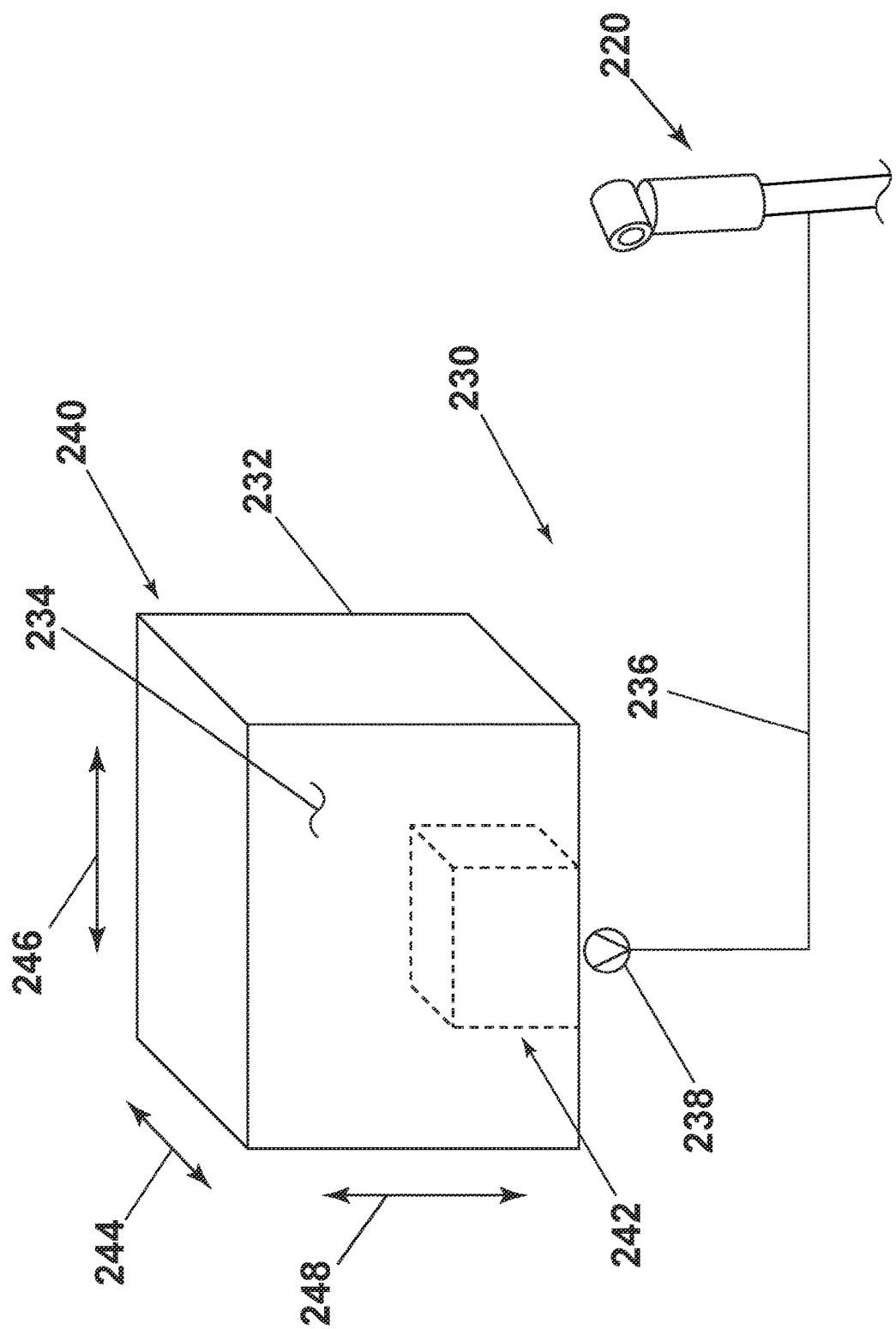
FIG. 2 is a schematic perspective view of an exemplary hydraulic fluid reservoir suitable for use as the hydraulic fluid reservoir of FIG. 1, further including a flexible housing.

FIG. 2 is a schematic perspective view of an exemplary hydraulic fluid reservoir 230 suitable for use as the hydraulic fluid reservoir 130 of FIG. 1. The hydraulic fluid reservoir 230 is similar to the hydraulic fluid reservoir 130, therefore, like parts will be identified with like numerals increased to the 200 series, with it being understood that the description of the like parts of the hydraulic fluid reservoir 130 applies to the hydraulic fluid reservoir 230 unless otherwise noted.

The hydraulic fluid reservoir 230 can be provided within a vehicle (e.g., the vehicle 100 of FIG. 1). The hydraulic fluid reservoir 230 can include a fluid channel 236 fluidly coupling the hydraulic fluid reservoir 230 to a portion of the vehicle. As a non-limiting example, the fluid channel 236 can fluidly couple the hydraulic fluid reservoir to a shock absorber 220 of the vehicle. It will be appreciated that the shock absorber 220 can be any suitable shock absorber within the vehicle (e.g., the front shock absorber 126 and the rear shock absorber 120 of FIG. 1).

The hydraulic fluid reservoir 230 is a schematic illustration. As illustrate, the hydraulic fluid reservoir 230 can include a flexible housing with a flexible wall 232 defining an interior. The flexible wall 232 is illustrated as a rectangular cube, however, it will be appreciated that the flexible wall 232 can take any suitable shape. As a non-limiting example, the flexible wall 232 can be a bag. As a non-limiting example, the flexible wall 232 can be in any other suitable shape, such as, but not limited to, a triangle, a circle, an ellipse, or the like. The flexible wall 232 can be made of any suitable material such as, but not limited to thermoplastics, rubbers, plastics, or metals.

The interior 234 can hold a volume of hydraulic fluid. It is contemplated that the interior 234 holds only a volume of hydraulic fluid. In other words, the interior 234 does not include a gas (e.g., air). The fluid channel 236 can be fluidly coupled to the interior 234. A pump 238 can be provided along the fluid channel 236.

During operation of the hydraulic fluid reservoir 230, the pump 238 is used to move a flow of hydraulic fluid between the interior 234 and the shock absorber 220 in order to increase or decrease the pressure of hydraulic fluid within the shock absorber 220. The pump 238 can be controlled through any suitable method and be responsive to a demand of hydraulic fluid from the shock absorber 220. As a non-limiting example, if a pressure of the hydraulic fluid is too high within the shock absorber 220, the pump 238 can transfer at least a portion of the hydraulic fluid within the shock absorber 220 into the interior 234 of the hydraulic fluid reservoir 230.

As hydraulic fluid is moved into and out of the hydraulic fluid reservoir 230, the flexible housing can expand and contract, respectively. The volume of the interior 234 or the size of the flexible wall 232 is dictated by the total amount of hydraulic fluid within the interior 234. As illustrated, the hydraulic fluid reservoir 230 can move between a first position 240 and a second position 242. The first position 240 can be defined as the positioning of the flexible wall 232 when a maximum amount of hydraulic fluid is received within the interior 234. The second position 242 can be defined as the positioning of the flexible wall 232 when a minimum amount of hydraulic fluid (e.g., no hydraulic fluid) is received within the interior 234. The first position 240 can be defined as an expanded position, while the second position 242 can be defined as a contracted position. The flexible wall 232 is free to move between the first position 240 and the second position 242 dependent on the amount of hydraulic fluid within the interior 234.

When moving in between the first position 240 and the second position 242, the flexible wall 232 can expand or contract in at least one plane of motion. As illustrated, the flexible wall 232 can expand and contract along a first plane of motion 244, a second plane of motion 246, and a third plane of motion 248. Alternatively, the flexible wall 232 can expand or contract along at least one of the first plane of motion 244, the second plane of motion 248, and the third plane of motion 248.

The interior 234 does not include a gas. In other words, the interior 234 only includes the hydraulic fluid or nothing (e.g., when the flexible wall 232 is in the second position 242 and the hydraulic fluid is completely removed from the interior 234). As the flexible wall 232 moves based on the amount of hydraulic fluid within the interior 234 and that there is no other liquid or gas within the interior 234 besides the hydraulic fluid, the size of the flexible wall 232 correlates to the total volume of hydraulic fluid within the interior 234 plus a material of the flexible wall 232. As the interior 234 only includes the hydraulic fluid and no other liquid or gas, the space required for the hydraulic fluid reservoir 230 is minimized. In other words, the space in the vehicle required by the hydraulic fluid reservoir 230 is solely dependent on a maximum amount of hydraulic fluid that will be received within the hydraulic fluid reservoir 230 and the material of the hydraulic fluid reservoir 230. If, for example, air were in the interior 234 at all times, the total space required for the hydraulic fluid reservoir 230 would be increased as the total space required would be the maximum amount of hydraulic fluid that will be received within the hydraulic fluid reservoir 230 plus the material of the hydraulic fluid reservoir 230 plus a total volume of air within the interior 234. Further, without a liquid or gas that is not the hydraulic fluid within the interior 234, the hydraulic fluid within the interior 234 directly abuts an interior of the flexible wall 232 such that the there is no room for the hydraulic fluid to move around in the interior 234 (e.g., 100% of the interior 234 is the hydraulic fluid). This, in turn, means that the hydraulic fluid will not slosh around within the interior 234 and create noise.

Further yet, the only way of the hydraulic fluid to leave or enter the interior 234 is through the fluid channel 236. The fluid channel 236 is sealingly coupled to the interior 234 such that the hydraulic fluid cannot egress from the hydraulic fluid reservoir 230. In other words, hydraulic fluid cannot leak from the hydraulic fluid reservoir 230.

Figure 3:
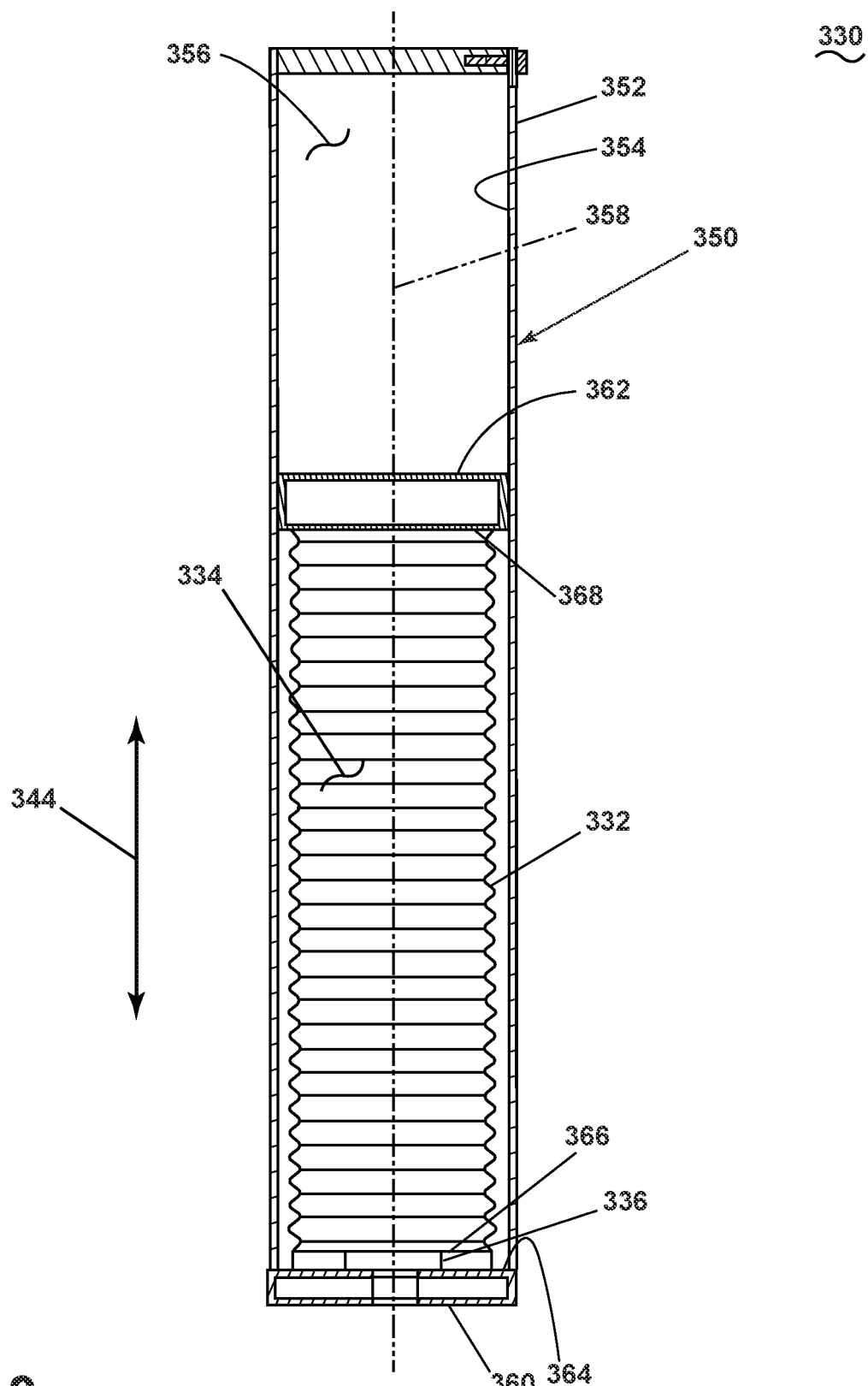
FIG. 3 is a schematic cross-sectional view of an exemplary hydraulic fluid reservoir suitable for use as the hydraulic fluid reservoir of FIG. 1, further including a flexible housing provided within an interior of an outer wall.

FIG. 3 is a schematic cross-sectional view of an exemplary hydraulic fluid reservoir 330 suitable for use as the hydraulic fluid reservoir 130 of FIG. 1. The hydraulic fluid reservoir 330 is similar to the hydraulic fluid reservoir 130, 230, therefore, like parts will be identified with like numerals increased to the 300 series, with it being understood that the description of the like parts of the hydraulic fluid reservoir 130, 230 applies to the hydraulic fluid reservoir 230, 330 unless otherwise noted.

The hydraulic fluid reservoir 330 can be provided within a vehicle (e.g., the vehicle 100 of FIG. 1). The hydraulic fluid reservoir 330 can include a fluid channel 336 fluidly coupling the hydraulic fluid reservoir 330 to a portion of the vehicle. As a non-limiting example, the fluid channel 336 can fluidly couple the hydraulic fluid reservoir to a shock absorber (not illustrated) of the vehicle. The hydraulic fluid reservoir 330 is defined by an axial centerline 358. The hydraulic fluid reservoir 330 can include a flexible housing having a flexible wall 332 configured to move along at least one plane of motion 344 (e.g., any of the first plane of motion 244, the second plane of motion 246, or the third plane of motion 248 of FIG. 2). The flexible wall 332 can define a first interior 334 fluidly coupled to the fluid channel 336. A hydraulic fluid can be supplied to and from the first interior 334 via the fluid channel 336. The flexible wall 332 can expand and contract between a first position and a second position based on the volume of hydraulic fluid within the first interior 334.

The flexible wall 332 is similar to the flexible wall 232, however, the flexible wall 332 is a corrugated wall. As such, during movement of the flexible wall 232 along the at least one plane of motion 344, the flexible wall 232 can fold into or out of itself in an accordion style movement. The flexible wall 332 can extend between a first end 366 and a second end 368. It is contemplated that at least one of the first end 366 or the second end 368 can be fixed such that when moving between the first position and the second position, only one of the first end 366 or the second end 368 moves. As a non-limiting example, the second end 368 can be free to move while the first end 366 is static.

The hydraulic fluid reservoir 330 can further include an outer housing having an outer wall 350. The outer wall 350 can have an outer face 352 and an inner face 354. The inner face 354 can at least partially define a second interior 356. The flexible housing, and thus the first interior 334, can be received within the second interior 356. The first interior 334 and the second interior 356 are fluidly separate from one another. The outer wall 350 can be any suitable rigid material. In other words, the outer wall 350 does not expand and contract like the flexible wall 332. Alternatively, the outer wall 350 can be provided around the flexible wall 332 and include a flexible material such that the outer wall 350 can expand and contract with the flexible wall 332. During movement of the flexible wall 332, the inner face 354 of the outer wall 350 can act as a guide to the movement of the flexible wall 332 along the at least one plane of motion 344. As such, the flexible wall 332 can translate or move within the second interior 356 along the at least one plane of motion 344.

The outer wall 350 can terminate at distal ends to define at least one opening 364 through which the fluid channel 336 extends through. Alternatively, the outer wall 350 can extend to the fluid channel 336 and otherwise define a portion of the fluid channel 336. In other words, at least a portion of the outer wall 350 can define a corresponding portion of the fluid channel 336 such that the at least one opening 364 of the outer wall 350 corresponds to the fluid channel 336.

The hydraulic fluid reservoir 330 can further include a first plate 360 and a second plate 362. The first plate 360 can be operably coupled to the second end 368 and be received within the second interior 356. The first plate 360 can be sized such that it confronts (e.g., directly contacts) the inner face 354 of the outer wall 350. As such, when the flexible wall 332 moves along the at least one plane of motion 344, the first plate 360 can act as a guide for the flexible wall 332 within the second interior 356. The second plate 362 can be provided along a portion of the outer wall 350. As a non-limiting example, the second plate 362 can be provided along a portion of the at least one opening 364. The second plate 362 can define a portion of the fluid channel 336. The second plate 362 can be operably coupled to or otherwise integrally formed with the first end 366 of the flexible wall 332. The second plate 362 can be operably coupled to or otherwise integrally formed with the outer wall 350. As such, the second plate 362 can operably couple or integrally form the flexible wall 332 with the outer wall 350. The second plate 362 can further fluidly and sealingly couple the fluid channel 336 to the first interior 334.

The hydraulic fluid reservoir 330 can utilize the outer wall 350 as a protective barrier of the flexible wall 332 by ensuring that the flexible wall 332 is not exposed to various portions of the vehicle outside of the second interior 356. Further, the outer wall 350 can be mounted to or otherwise integrally formed with a portion of the vehicle that the hydraulic fluid reservoir 330 is provided within. As such, the outer wall 350 can act as a method of mounting the hydraulic fluid reservoir 330. Further, as the hydraulic fluid reservoir 330 includes the outer wall 350 and the first plate 360, the outer wall 350 can act as a guide for the expansion and contraction of the flexible wall, thus defining the direction that the at least one plane of motion 344 is in.

Benefits of the present disclosure include a hydraulic fluid reservoir that is more flexible than a conventional hydraulic fluid reservoir. For example, the conventional hydraulic fluid reservoir relies on a rigid structure in which the hydraulic fluid is received within. When the hydraulic fluid is removed, air is brought in to fill the void. When hydraulic fluid is brought in, air is pushed out to make room for the hydraulic fluid. The total volume of an interior of the hydraulic fluid reservoir does not change. As such, the rigid structure of the hydraulic fluid reservoir must be sized to fit the volume of hydraulic fluid and air. Further, additional structure is needed for this configuration such as, but not limited to, a bleed air valve configured to release and take in a flow of air as needed. The hydraulic fluid reservoir as described herein, however, includes the flexible housing that adapted to receive the hydraulic fluid and only the hydraulic fluid. This, in turn, means that additional structure (e.g., the bleed air valve) is not needed, thus reducing the complexity of the hydraulic fluid reservoir when compared to the conventional hydraulic fluid reservoir. As such, the hydraulic fluid reservoir as described herein has a less complex or otherwise more simple construction than the conventional hydraulic fluid reservoir. Thus, reducing the burden and cost of manufacture of the hydraulic fluid reservoir when compared to the conventional hydraulic fluid reservoir. Further, as only hydraulic fluid is in the interior of the flexible housing, the maximum size of the flexible housing is based entirely on a maximum volume of hydraulic fluid and not the maximum volume of the hydraulic fluid and the air as the conventional hydraulic fluid reservoir is based on.

Further benefits of the present disclosure include a hydraulic fluid reservoir configured to receive only a volume of hydraulic fluid in comparison with a conventional hydraulic fluid reservoir. For example, as discussed above, the conventional hydraulic fluid reservoir includes air and hydraulic fluid. Additional structure, such as the bleed air valve is needed to accommodate of the movement of the air into and out of the hydraulic fluid reservoir. As there is air and hydraulic fluid within the conventional hydraulic fluid reservoir, the hydraulic fluid is free to move around and make Nosie as it hits the interior portions of the conventional hydraulic fluid reservoir. Further, in some instances (e.g., when the vehicle is tilted or an especially large bump is hit) the hydraulic fluid can leak from the bleed air valve. The hydraulic fluid reservoir as described herein, however, eliminates the sound and leaking issue. For example, the hydraulic fluid reservoir does not include air within the interior of the flexible housing, thus the hydraulic fluid does not have room to move around. This, in turn, greatly reduces the noise associated with the movement of the hydraulic fluid within the hydraulic fluid reservoir when compared to the conventional hydraulic fluid reservoir. Further, as there is no need to have the added structure (e.g., the bleed air valve) as there is no air within the flexible housing. As such, there is no way for the hydraulic fluid to leak from the hydraulic fluid reservoir, thus eliminating the leakage problem associate with the conventional hydraulic fluid reservoir.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A hydraulic fluid reservoir fluidly coupled to a shock absorber, the hydraulic fluid reservoir comprising:
    a flexible housing having a first end and second end and a flexible wall extending therebetween defining a first interior, with the first interior a variable volume of hydraulic fluid and no air;
    a fluid channel beginning at the first end of the flexible housing and fluidly coupling the first interior of the flexible housing to the shock absorber, the fluid channel configured to permit a flow of hydraulic fluid to enter and exit the first interior of the flexible housing to define the variable volume of hydraulic fluid; and
    a pump provided along the fluid channel, the pump being configured to move the flow of hydraulic fluid into or out of the flexible housing;
    wherein during operation, the flow of hydraulic fluid expands and contracts the flexible housing between a first position defining a maximum volume of the first interior and a second position defining a minimum volume of the first interior, respectively.

2. The hydraulic fluid reservoir of claim 1, further comprising an outer housing having an outer wall defining a second interior.

3. The hydraulic fluid reservoir of claim 2, further comprising a first plate operably coupled to the second end of the flexible housing, wherein at least a portion of the first plate confronts an interior portion of the outer wall.

4. The hydraulic fluid reservoir of claim 3, wherein the outer housing includes an opening and wherein the fluid channel extends through the opening.

5. The hydraulic fluid reservoir of claim 4, further comprising a second plate provided along the first end and including a portion of the fluid channel, wherein the first plate is statically mounted to the opening of the outer housing.

6. The hydraulic fluid reservoir of claim 3, wherein the outer housing defines an axial centerline and wherein the first plate and the flexible housing are configured to move axially, with respect to the axial centerline, when moving between the first position and the second position.

7. The hydraulic fluid reservoir of claim 2, wherein the flexible housing is provided entirely within the second interior.

8. The hydraulic fluid reservoir of claim 1, wherein the flexible wall is corrugated such that the flexible housing moves in an accordion style when moving between the first position and the second position.

9. The hydraulic fluid reservoir of claim 1, wherein the flexible wall is a membrane configured to expand or contract based on the flow of hydraulic fluid entering or exiting the membrane.

10. The hydraulic fluid reservoir of claim 1, wherein the flexible housing is configured to expand and contract uniformly along at least one plane of motion.

11. The hydraulic fluid reservoir of claim 1, wherein the flexible housing is configured to expand and contract non-uniformly along at least one plane of motion.

12. The hydraulic fluid reservoir of claim 1, wherein the hydraulic fluid reservoir is fluidly coupled to the shock absorber for use within a vehicle.

13. The hydraulic fluid reservoir of claim 1, wherein the fluid channel does not extend into the flexible housing.

14. The hydraulic fluid reservoir of claim 1, wherein the flexible housing holds only a volume of hydraulic fluid.

15. A hydraulic fluid reservoir fluidly coupled to a shock absorber, the hydraulic fluid reservoir comprising:
    a flexible housing having a first end and second end and a flexible wall extending therebetween defining a first interior, with the first interior a variable volume of hydraulic fluid and no air;
    an outer housing having an outer wall defining a second interior;
    a fluid channel beginning at the first end of the flexible housing and fluidly coupled to the first interior and configured to permit a flow of hydraulic fluid to enter and exit the first interior of the flexible housing to define the variable volume of hydraulic fluid; and
    a pump provided along the fluid channel, the pump being configured to move the flow of hydraulic fluid into or out of the flexible housing;
    wherein the flexible housing is provided within the second interior.

16. The hydraulic fluid reservoir of claim 15, wherein the outer casing includes an opening, and wherein the fluid channel extends through the opening.

17. The hydraulic fluid reservoir of claim 16, further comprising:
    a first plate operably coupled to the second end of the flexible housing; and
    a second plate provided along the first end and including a portion of the fluid channel, wherein the first plate is statically mounted to the opening of the outer housing;
    wherein at least a portion of the first plate confronts an interior portion of the outer wall; and wherein the fluid channel extends through the opening.

18. The hydraulic fluid reservoir of claim 15, wherein the flexible wall is corrugated such that the flexible housing moves in an accordion style when moving between the first position and the second position.

19. The hydraulic fluid reservoir of claim 15, wherein the flexible wall is a membrane configured to expand or contract based on the flow of hydraulic fluid entering or exiting the membrane.

20. A hydraulic fluid reservoir comprising:
- a flexible housing having a first end and second end and a flexible housing wall defining an interior;
- a fluid channel beginning at the first end of the flexible housing and fluidly coupled to the interior and configured to permit a flow of hydraulic fluid to enter and exit the interior of the flexible housing; and
- a pump provided along the fluid channel, the pump being configured to move the flow of hydraulic fluid into or out of the flexible housing;
- wherein during operation, the flow of hydraulic fluid can enter or exit the interior of the flexible housing to expand and contract the flexible housing between a first position defining a maximum volume of the interior and a second position defining a minimum volume of the interior, respectively.

\* \* \* \* \*